A. N. FELTON.
STEAM HEATING.
APPLICATION FILED AUG. 5, 1914.
1,158,996.
Patented Nov. 2, 1915.
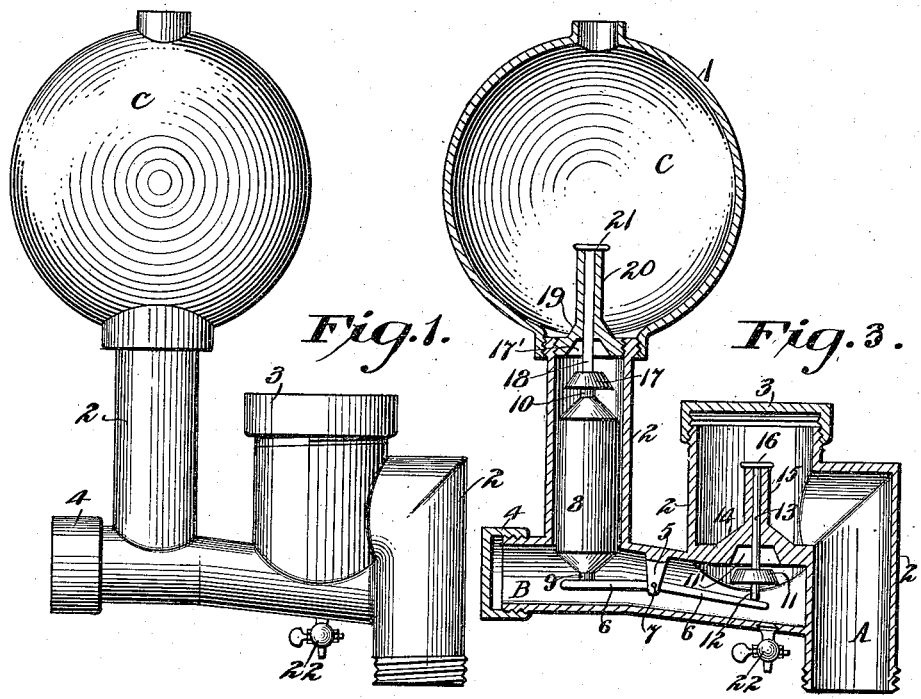
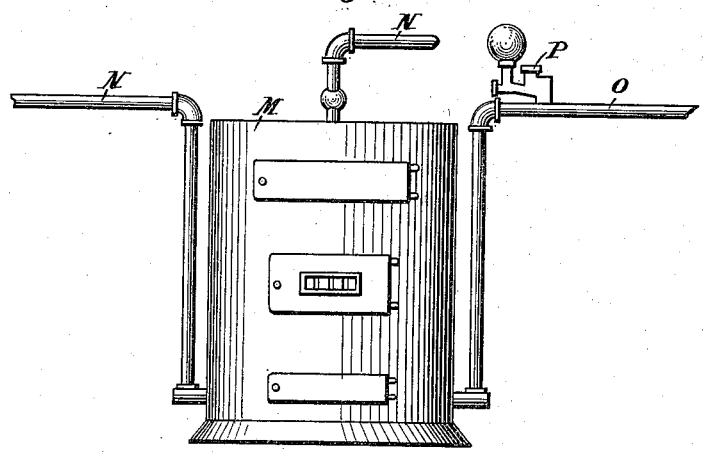
Witnesses:
Inventor:

UNITED STATES PATENT OFFICE.

ALFORD N. FELTON, OF ARMOUR, SOUTH DAKOTA.

STEAM-HEATING.

1,158,996.  Specification of Letters Patent.  Patented Nov. 2, 1915.

Application filed August 5, 1914. Serial No. 855,120½.

*To all whom it may concern:*

Be it known that I, ALFORD N. FELTON, a citizen of the United States, residing at Armour, in the county of Douglas and State of South Dakota, have invented a new and useful Improvement in Steam-Heating.

My invention relates to what is known as vacuum steam heating, and the objects I attain are simplicity, serviceability, durability and economy. I attain these results as shown, illustrated and explained as follows:

Figure 1 is an outside view of my invention. Fig. 2 shows attachment of my invention to the return pipe of a steam heating plant having a common return pipe from all the radiators. Fig. 3 shows a vertical cross-section of my invention showing the working parts in place.

In Fig. 2—M is the steam boiler of heating plant. N is the steam main leading from the boiler. N' is the steam main returning to the boiler. O is the return main leading to the boiler. P is my invention attached to the return main.

In Fig. 3—A is the passage from return main into my invention. B is a chamber containing water and some of the parts of my invention. C is a chamber holding condensation to prevent possible overflow. 1, 2, 3 and 4 compose the shell containing the working parts of my invention. 5 is the support for bar 6. 6 is a swinging bar through which float 8 closes the vacuum retaining valve. As condensation returns to the boiler through the vacuum retaining valve, float 8 descends, presses down on one end of the bar 6 causing the opposite end to rise and push the gate 11 of the vacuum retaining valve to its seat. 7 is a bolt on which bar 6 swings. 8 is a float that rises and falls by buoyancy of water. 9 and 10 are bumpers on float 8. 11 is the vacuum valve gate. 11' is the vacuum valve seat. 12 is the bumper on gate of vacuum valve. 13 is the guide stem of the vacuum valve gate. 14 are posts connecting seat 11' with guide cylinder 15. 15 is the guide cylinder of stem 13. 11, 11', 12, 13, 14, 15 and 16 compose the vacuum valve. 17, 17', 18, 19, 20 and 21 compose the steam and air escape valve through which air escapes from the pipes and radiators of the heating system. 22 is an emergency cock to allow blow-off of sediment that may lodge in chamber B and interfere with the working parts.

In my invention I take advantage of the known fact that steam at very low pressure travels rapidly in pipes and radiators that have an easy outlet for the air they contain. The return pipe of the heating plant connects with my invention at the lower part of chamber A. Air being forced through the heating plant passes into chamber A, presses against gate 11 of vacuum valve causing it to open and allowing passage of air into chamber B, through which it passes, and on to the outside through the steam valve and the opening at the top of chamber C. When the air has been thus evacuated from the heating plant steam and condensation following into chamber B causes float 8 to rise closing steam valve gate 17 thereby preventing outlet of steam and condensation. Pressure from within holds gate 17 closed till pressure from within the heating plant drops to atmospheric pressure, when gate 17 opens by gravity and as water passes back through gate 11 float 8 falls till bar 6 swings and closes gate 11. The proportion of the parts is such that when gate 11 closes there is water resting against it causing a water seal against entrance of air. Gate 11 is constructed to close water tight. Compartment B contains water and should any evaporate steam and condensation replaces it.

I claim:

In combination, in a steam heating plant having a common return pipe from all the radiators, a vacuum retaining valve, a water seal, an air escape and steam valve, a float, and a swinging bar, said float controlling said air escape and steam valve directly and said vacuum retaining valve through said swinging bar.

ALFORD N. FELTON.

Witnesses:
 J. G. WOLF,
 F. G. HOETE.

Copies of this patent may be obtained for five cents each, by addressing the "Commissioner of Patents, Washington, D. C."